United States Patent
Morelli et al.

(10) Patent No.: US 6,941,824 B2
(45) Date of Patent: Sep. 13, 2005

(54) MAGNETIC FORCE SENSOR AND CONTROL CIRCUIT FOR SAME

(75) Inventors: Donald T. Morelli, White Lake, MI (US); Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/423,317

(22) Filed: Apr. 25, 2003

(65) Prior Publication Data

US 2004/0211268 A1 Oct. 28, 2004

(51) Int. Cl.[7] .................................................. G01L 1/12
(52) U.S. Cl. .................................................. 73/862.69
(58) Field of Search ........................ 73/862.69, 862.33, 73/862.325, 862.381, 862.333, 862.331, 862; 324/209

(56) References Cited

U.S. PATENT DOCUMENTS

| | | | | |
|---|---|---|---|---|
| 3,612,986 A | * | 10/1971 | Roliwitz et al. | 324/209 |
| 3,681,982 A | * | 8/1972 | Hiratsuka et al. | 73/862.69 |
| 3,792,348 A | * | 2/1974 | Rollwitz et al. | 324/209 |
| 4,881,414 A | * | 11/1989 | Setaka et al. | 73/862.331 |
| 4,931,730 A | * | 6/1990 | Olsen et al. | 324/209 |
| 5,142,227 A | * | 8/1992 | Fish | 324/209 |
| 5,419,207 A | * | 5/1995 | Kobayashi et al. | 73/862.333 |
| 5,437,197 A | | 8/1995 | Uras et al. | 73/862.69 |
| 5,522,269 A | * | 6/1996 | Takeda et al. | 73/862.333 |
| 5,565,773 A | * | 10/1996 | Inaguma et al. | 324/239 |
| 5,589,645 A | * | 12/1996 | Kobayashi et al. | 73/862.335 |
| 5,811,695 A | * | 9/1998 | Satoh et al. | 73/862.331 |
| 5,850,045 A | * | 12/1998 | Harada et al. | 73/862.333 |
| 6,356,077 B1 | | 3/2002 | Schaer et al. | 324/209 |
| 6,422,360 B1 | | 7/2002 | Oliver et al. | |
| 6,508,480 B2 | | 1/2003 | Smith, Jr. et al. | |
| 6,622,577 B1 | * | 9/2003 | Uras | 73/862.69 |
| 6,698,299 B2 | * | 3/2004 | Cripe | 73/862.331 |

FOREIGN PATENT DOCUMENTS

| DE | 715232 | 12/1941 |
|---|---|---|
| DE | 2928617 | 1/1981 |
| DE | 3604088 | 8/1987 |

* cited by examiner

*Primary Examiner*—Edward Lefkowitz
*Assistant Examiner*—Takisha Miller
(74) *Attorney, Agent, or Firm*—Jimmy L. Funke

(57) ABSTRACT

A magnetic force sensor and method for measuring a force applied to an object. A magnetostrictive element mounted on at least a portion of the object is subjected to a prestress. A conductive coil is wound around at least a portion of the magnetostrictive element. An excitation source, which includes one of a current source and a voltage source, excites the conductive coil. A detection circuit detects one of an induced voltage across the conductive coil and a voltage drop across a resistor in series with the conductive coil. The detected voltage can be used to determine the applied force. A second coil can be used in a bipolar sensor or to correct for variations in ambient conditions.

30 Claims, 6 Drawing Sheets

MAGNETIC FORCE SENSOR AND CONTROL CIRCUIT FOR SAME

TECHNICAL FIELD

The invention relates to sensors and, more particularly, to magnetic force sensors and a control circuit for a magnetic force sensor.

BACKGROUND OF THE INVENTION

Typical state of the art force sensors use strain gauges to measure the amount of strain of an object under an applied force. The strain gauges are usually metallic in laboratory and test applications and integrated silicon (Si) piezoresistive devices in commercial applications. The gauges are attached to an object to which force is applied, usually by fixing each gauge to the object using a bonding agent such as an epoxy. The applied force causes a change in the aspect ratio (i.e., length divided by cross-sectional area) of the metal filament comprising the gauge, changing the resistance of the gauge. In the case of piezoresistive Si devices, the piezoresistance of Si is responsible for the change in resistance in response to the applied strain. Since this change in resistance is small, the gauge is usually incorporated as one of the arms of a Wheatstone bridge such that the output voltage of the bridge, adjusted to be zero under zero applied force, is proportional to the applied force.

Accurate measurement of strain, and thus the force applied to the object, depends upon the quality of the bond between the gauge and the object. However, the reliability of the bond between the gauge and the object can change drastically with temperature, applied force and other variables. In addition, the reliability of the bond is difficult to measure in any case. One prior art solution proposed is U.S. Pat. No. 5,437,197 to Uras et al., the entire content of which is incorporated herein in its entirety by reference. Uras et al. describes a force sensor based upon the principle of inverse magnetostriction, which is defined as a change in the magnetic properties of a substance under applied stress or strain. A magnetic flux is induced in a magnetic circuit by either a permanent magnet or a coil to which an alternating current is supplied. A detection coil sees an induced voltage. When a force is applied, magnetic properties of the circuit are altered, changing the flux and, consequently, the induced voltage. The sensor of Uras et al., however, is expensive and large, making it difficult to use in a variety of applications.

SUMMARY OF THE INVENTION

The present invention discloses a magnetic force sensor and control circuit for the sensor. The present invention solves some problems identified in Uras et al., such as size and expense, that make Uras et al. difficult to implement. The invention can also be used in a wide variety of applications.

One embodiment of the present invention is a magnetic force sensor for measuring a force applied to an object. The magnetic force sensor includes a magnetostrictive element mountable on at least a portion of the object and the magnetostrictive element is subjected to a prestress when in its mounted position. A conductive coil is wound around at least a portion of the magnetostrictive element. An excitation source is used for exciting the conductive coil and includes either a current source or a voltage source. A detection circuit is used for detecting either an induced voltage across the conductive coil or a voltage drop across a resistor in series with the conductive coil.

A second embodiment of the present invention is a method of measuring a force applied to an object. The method includes the step of mounting a magnetostrictive element on at least a portion of the object. The magnetostrictive element is subjected to a prestress force, and a conductive coil is wound around at least a portion of the magnetostrictive element. The method also includes the steps of exciting the conductive coil using either a current source or a voltage source and detecting either an induced voltage across the conductive coil or a voltage drop across a resistor in series with the conductive coil.

Additional variations of the embodiments of the present invention are described in more detail herein. Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
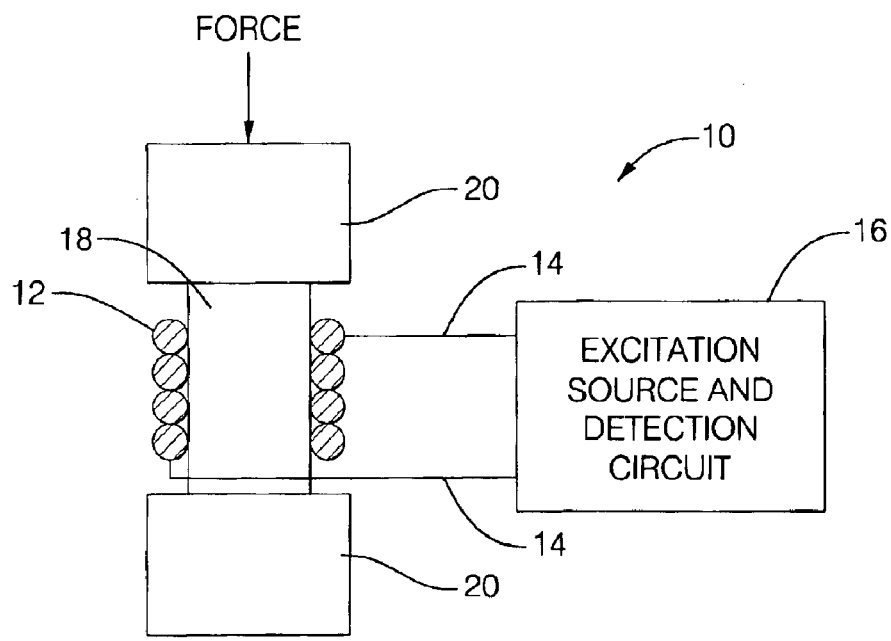
FIG. 1 is a schematic diagram of the force sensor according to the present invention used with a shaft.

A force sensor 10 according to the present invention is described with reference to FIGS. 1–12. FIG. 1 shows one embodiment of the force sensor 10, which includes a single coil 12 connected through leads 14 to circuitry 16, which includes an excitation source and a detection circuit, discussed in further detail herein. The coil 12 surrounds a shaft 18, which comprises a magnetostrictive material such that its magnetic state is altered under an applied force. A shaft 18, associated with, for example, a motor is not the only element with which the coil 12 can be used; the coil 12 must merely surround a magnetostrictive element. For example, the coil 12 can surround a magnetostrictive bar or can surround at least a portion of a magnetostrictive ring. In addition, the magnetostrictive element, such as the shaft 18, should be mounted such that it is subjected to a prestress. Where the coil 12 surrounds at least a portion of a ring, for example, the ring can be slid into a bushing or washer for support and prestressed by a compressive force into a hole. With the shaft 18 of FIG. 1, a prestress is applied through two end structures 20. The support, such as end structures 20, can be made of a non-magnetic material such as aluminum. Preferably, however, any support is made of a magnetically-conductive material.

The coil 12 of FIG. 1 can be excited using an alternating current of constant magnitude. This alternating current gives rise to an inductive voltage across the coil 12, the magnitude of which is determined by the self-inductance of the coil 12. The self-inductance of the coil 12 is in turn dependent upon the number of turns comprising the coil 12, the permeability of the magnetostrictive material of the shaft 18 and a geometrical factor related to the ratio of the radius of the coil 12 to its height. When operated in a current mode, the root-mean-squared (RMS) voltage $V_{rms}$ across the coil 12 is given by the formula:

$$V_{rms} = \omega * I_{rms} * L + I_{rms} * R_L; \text{ where}$$

$\omega$ is the circular frequency of excitation;
$I_{rms}$ is the RMS magnitude of the current in the coil 12;
L is the inductance of the coil 12; and
$R_L$ is the resistance of the coil 12.

As force is applied to the shaft 18, its permeability is altered. As a result, the output voltage changes. The effect of the resistance $R_L$ can be neglected in the impedance when $\omega*L$ is much greater than $R_L$. Alternatively, one can compensate for the known value $R_L$ in the measurement mathematically. The change in output voltage $V_{rms}$ with the applied force F is thus given by the formula:

$$dV_{rms}/dF = \omega * I_{rms} * (dL/dF); \text{ where}$$

$dV_{rms}/dF$ is the change in the RMS voltage with respect to the change in the applied force; and
dL/dF is the change in the inductance of the coil 12 with respect to the change in the applied force.

Thus, the application of a current through the coil 12 results in a change in the induced voltage that reflects the change in permeability. The applied force can then be determined using these known relationships.

Experimental testing of the concept described above was completed using a coil 12 of approximately 2000 turns. The inner diameter of the coil 12 was ten mm, while the outer diameter was 25 mm. The shaft 18 was of ordinary magnetic steel with a diameter of ten mm. Using ordinary magnetic steel, which has a small positive magnetostrictive coefficient, means that under compressive stress, the permeability of the material decreases. Higher sensitivity may be obtained with materials having a higher magnetostrictive coefficients. For example, a nickel-iron shaft 18 is described in more detail with respect to FIG. 10. The shaft 18, with its surrounding coil 12, was placed in a hydraulic press capable of applying a compressive force of up to 40 kilo-Newtons- (kN) to the shaft 18. The root-mean-square (RMS) output voltage of the coil 12 was monitored using a standard multimeter under an applied force for various levels of current and excitation frequency.

Figure 2:
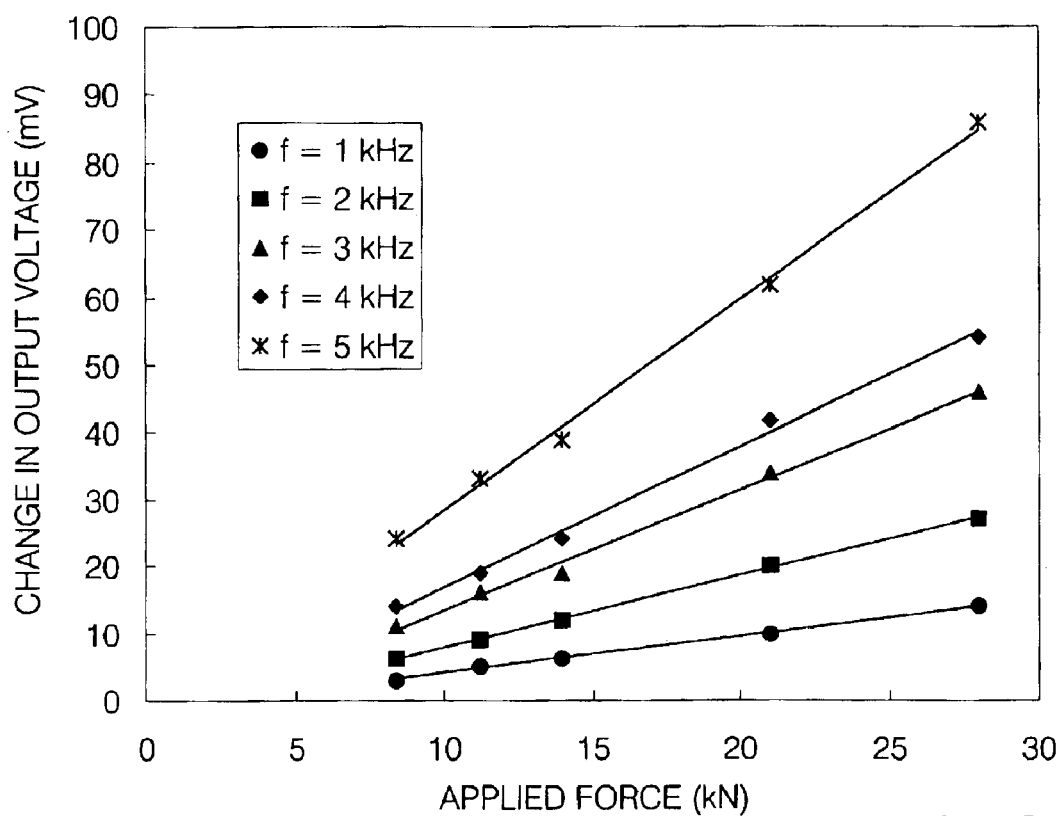
FIG. 2 is graph of output voltage of the force sensor according to FIG. 1 at various applied forces and frequencies of an excitation current source.
Figure 3:
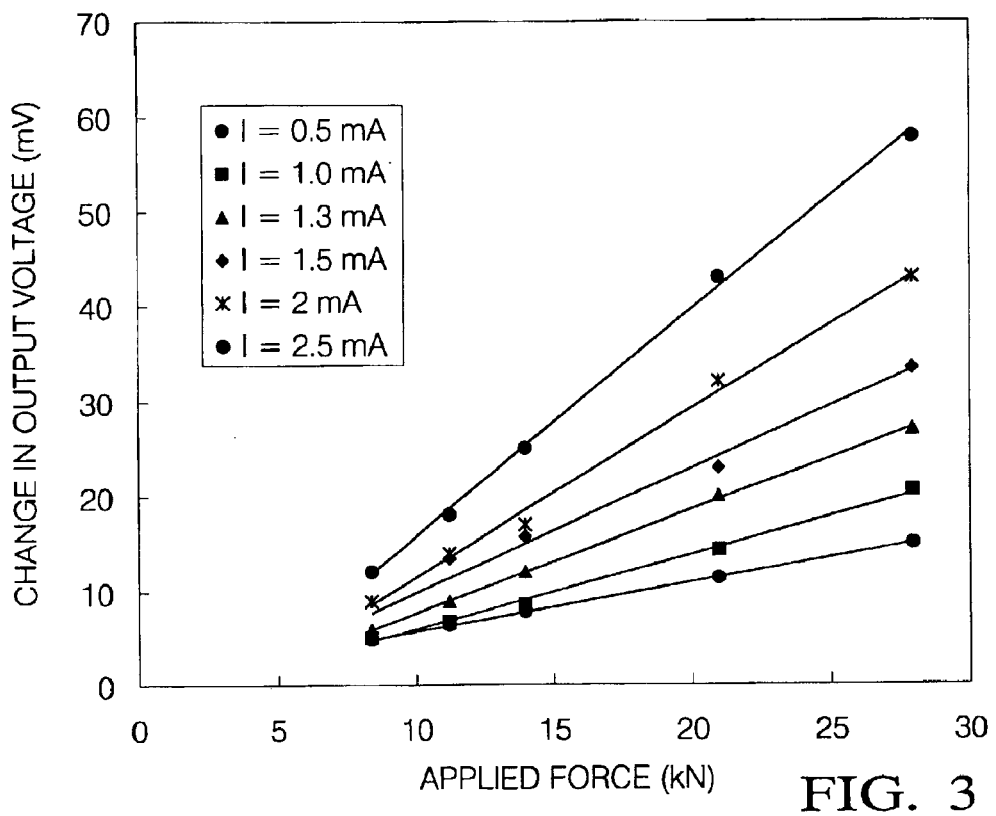
FIG. 3 is a graph of output voltage of the force sensor according to FIG. 1 at various applied forces and magnitudes of an excitation current at a constant frequency.
Figure 4:
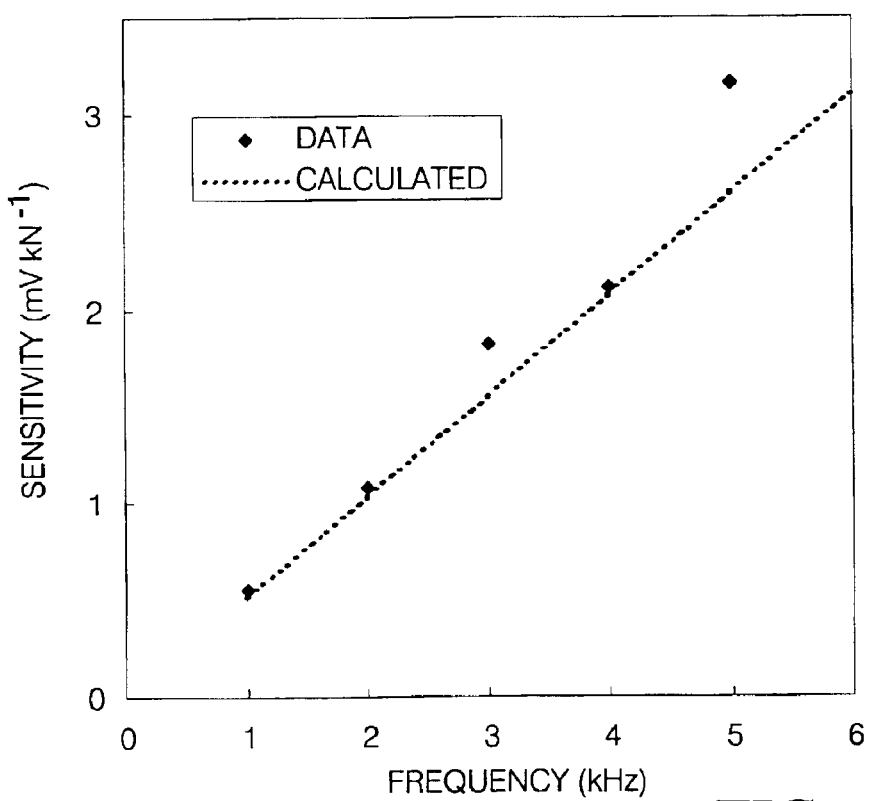
FIG. 4 is a graph showing the sensitivity of the output voltage of the force sensor according to FIG. 1 to the frequency of an excitation current.

FIG. 2 shows a graph where the frequency of a sinusoidal current with a constant amplitude of 1.3 milli-Amperes (mA) varies from one to five kilo-Hertz (kHz) in one kHz increments. For each separate frequency applied to the coil 12, the change in output voltage in millivolts (mV) for an applied force in kN is shown. A best-fit curve is then drawn for each of the frequencies. Similarly, FIG. 3 shows a graph where the amplitude of a sinusoidal current with a constant frequency of two kHz varies from 0.5 mA to 2.5 mA in 0.5 mA increments. For each separate amplitude applied to the coil 12, the change in output voltage in mV for an applied force in kN is shown. A best-fit curve is then drawn for each of the amplitudes. As can be seen from FIGS. 2 and 3, the induced voltage is linear to the applied force.

To verify that the change in the output voltage was due to the change in inductance of the coil 12, the inductance was directly measured using a Hewlett-Packard impedance analyzer. The following table summarizes measured changes in inductance with the applied force for the coil 12 tested at various frequencies. Consistent with expectations, the inductance of the coil 12 decreases with applied compressive force, since the permeability of the shaft material is decreased.

| | Measured Inductance Change (mH) | | | | | | |
|---|---|---|---|---|---|---|---|
| Force (kN) | 1 kHz | 2 kHz | 3 kHz | 4 kHz | 5 kHz | 10 kHz | |
| 0 | 147 | 133 | 127 | 123.5 | 121 | 116.4 | |
| 13.977 | 146.2 | 132.3 | 126.3 | 122.7 | 120.2 | 115.5 | |
| 27.955 | 145.2 | 131.3 | 125.5 | 121.7 | 119.2 | 114.4 | |
| dL/dF (mH/kN) | 0.064 | 0.061 | 0.054 | 0.064 | 0.064 | 0.071 | Average 0.063 |

Figure 5:
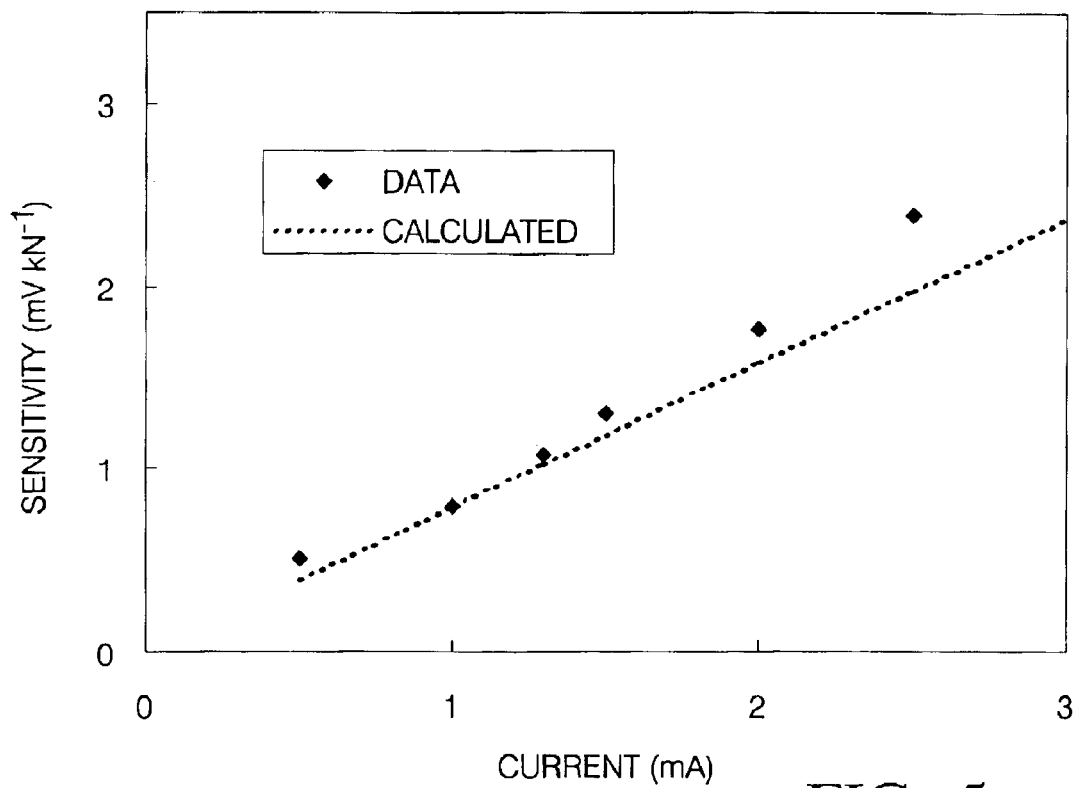
FIG. 5 is a graph showing the sensitivity of the output voltage of the force sensor according to FIG. 1 to the magnitude of an excitation current at a constant frequency.

From the average value of dL/dF of 0.063 mH/kN, one can calculate the sensitivity of the sensor 10, where sensitivity is defined as the change in output voltage divided by the change in applied force ($dV_{rms}/dF$) for the various frequencies and currents, and compare this is to measured sensitivity. For example, in FIG. 5, a dashed line shows the calculated sensitivity of the sensor 10. The equation that defines the dashed line in FIG. 5 for the case where the frequency f equals 2000 Hz and $\omega$ equals $2\pi f$, or 12560 rad/sec is $dV_{rms}/dF = \omega * I_{rms} * (dL/dF) = 0.79 * I_{rms}$. FIG. 5 also includes six data points representing the measured sensitivity for each of the six test amplitudes of the applied current described with reference to FIG. 3. Similarly, FIG. 4 includes a dashed line showing the calculated sensitivity of the sensor 10 and five data points representing the measured sensitivity for each of the five test frequencies of the applied current described with reference to FIG. 2. These graphs show that the sensitivity of the sensor 10 varies linearly with both the frequency and the magnitude of the applied current and that the measured values agree well with the calculated values.

This described embodiment of the sensor 10 uses simple circuitry 16, namely a sinusoidal current excitation source and a detection circuit that monitors the RMS output voltage of the coil 12 directly or samples the instantaneous induced voltage in the coil 12 and produces an RMS output voltage from the sample. Thus, the detection circuit can include a dedicated controller in the form of a microprocessor with memory or a microcontroller, or the storage of samples and the calculation of the RMS output voltage can be performed by a common, non-dedicated system controller. Regardless of whether a dedicated controller is included within the detection circuit or a non-dedicated, external controller is used, the controller can use the RMS output voltage in combination with the known relationships of the induced voltage in the coil 12 to its inductance and applied force, in the form of look-up tables or formulas, to determine the applied force.

Figure 6:
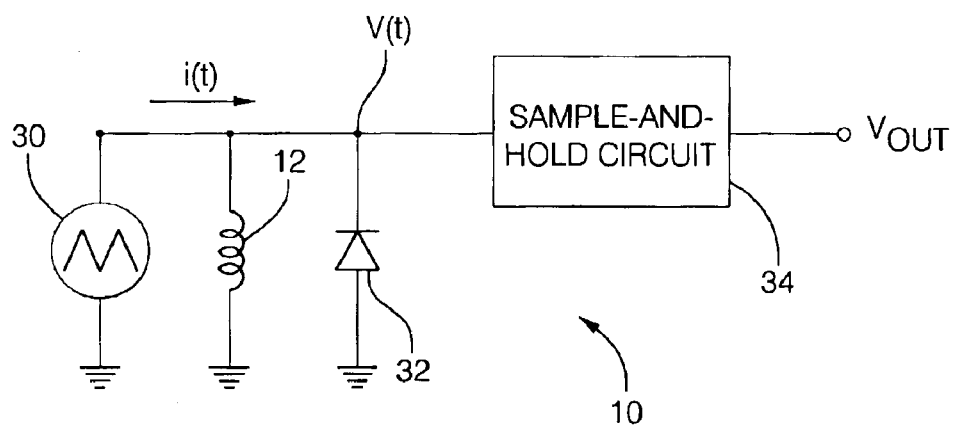
FIG. 6 is a schematic circuit diagram of a force sensor according to the present invention that is useful for unipolar sensing.
Figure 7:
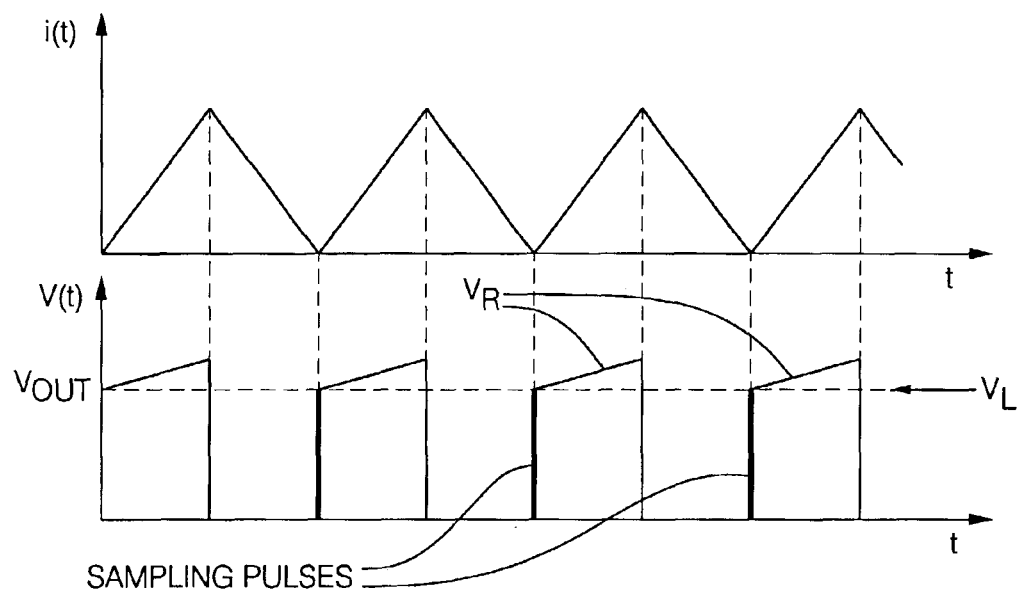
FIG. 7 shows graphs of the input current, input voltage and output voltage of the force sensor according to FIG. 6.

Many variations in this circuitry 16 are possible to produce a more sensitive sensor, such as by taking advantage of the unique properties of the induced voltage across the coil 12. One such sensor 10 is shown and described with reference to FIGS. 6 and 7. FIG. 6 is a simplified circuit diagram taking advantage of the relation V=L di/dt where V is the output voltage, L is the inductance of the coil 12 and di/dt is the time rate of change of the current through the coil 12. Specifically, a triangular-shaped drive current i(t) shown in FIG. 7 is supplied to the coil 12 by an excitation source 30, which is part of the circuitry 16. The source 30 shown is merely representative of any number of components known in the art that can produce the drive current i(t).

The circuitry 16 of the sensor 10, as mentioned, includes a detection circuit in addition to the excitation source 30. The detection circuit includes a diode 32 whose cathode is coupled to the coil 12 and whose anode is grounded. Also coupled to the coil 12 and the cathode of the diode 32 is a sample-and-hold circuit 34. Sample-and-hold circuits are generally available in the form of an integrated circuit (IC) whose use in a variety of applications, including automotive applications, for sampling various parameters are well within the level of skill of one in the art. Thus, beyond the need in this example for the sample-and-hold circuit 34 to sample and hold the value of V(t) at the beginning of each V(t) pulse, described herein, no additional details of the sample-and-hold circuit 34 need be discussed. It is, however, worth mentioning that in addition to a sample-and-hold circuit 34 incorporated into an IC, a combination of solid-state and analog components connected to perform the function of a sample-and-hold IC can be used. The output of the sample-and-hold circuit 34 is the voltage across the coil 12, $V_L$, which can then be used to determine the force applied to the shaft 18.

Voltage waveforms at various points in the sensor 10 of FIG. 6 are shown in FIG. 7. Because a triangular current has a constant di/dt, the voltage $V_L$ is directly proportional to the inductance of the coil 12. As the current i(t) applied to the coil 12 ramps up, the total voltage V(t) induced on the coil 12 jumps up to $V_L$. The total voltage V(t) also includes a resistive component, $V_R$. The resistive component $V_R$ of the total voltage V(t) gradually increases with the increasing value of i(t) such that the resistive component $V_R$ has the form of a ramp on top of the inductive component $V_L$. When the applied current i(t) ramps down from its peak, that is, has a negative slope di/dt, the voltage $V_L$ goes negative. The total voltage V(t) is, however, clamped at about zero because of the presence of the reverse-biased diode 32. The total voltage V(t) pulse ends when i(t) reaches its minimum value. The output voltage $V_{OUT}$ is equal to the positive value $V_L$ and is extracted by the sample-and-hold circuit 34 by acquiring the value of V(t) at the beginning of each V(t) pulse as shown in FIG. 7.

The sensor 10 of FIG. 6 is suitable for unipolar sensing, that is, sensing either a compressive or a tensile force. The flexibility of the sensor 10 can be substantially enhanced by the addition of a second detection coil and some additional circuitry. The sensor 10a shown in FIG. 8 includes the first coil 12 with a first inductance and a second coil 22 with a second inductance. The addition of the second coil 22 provides for at least two benefits over the sensor 10 of FIG. 6. First, in unipolar sensing the second coil 22 can be a "dummy" coil, which is exposed to the same ambient environment as the first coil 12, but is wound around an unstressed element. The second coil 22 is selected so that the unstressed impedance of the second coil 22 has a known relationship with respect to the unstressed impedance of the first coil 12. For example, the second coil 22 can have an impedance equal to half of the unstressed impedance of the first coil 12. In addition, the temperature variation of the resistance of the second coil 22 with respect to the resistance of the first coil 12 over the temperature range of the sensor should be known. The second coil 22 can thus serve as a reference for, for example, temperature compensation. Alternately, the second coil 22 can be used in a bipolar sensor where one of the coils is under compression and the other under tension. In either case, the sensor 10a according to FIG. 8 can be used.

Figure 8:
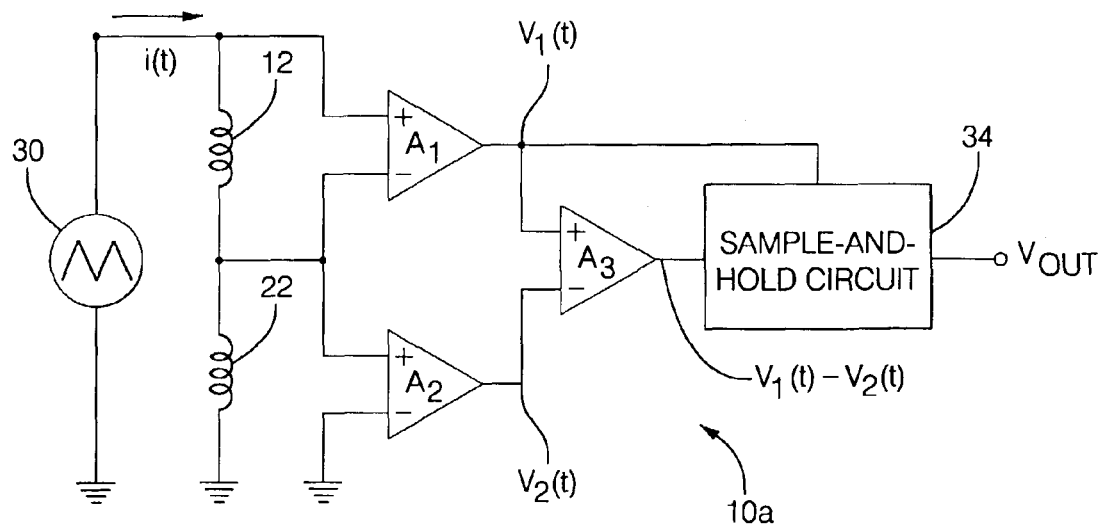
FIG. 8 is a schematic circuit diagram of a force sensor according to a second embodiment that is useful for either unipolar or bipolar sensing.
Figure 9:
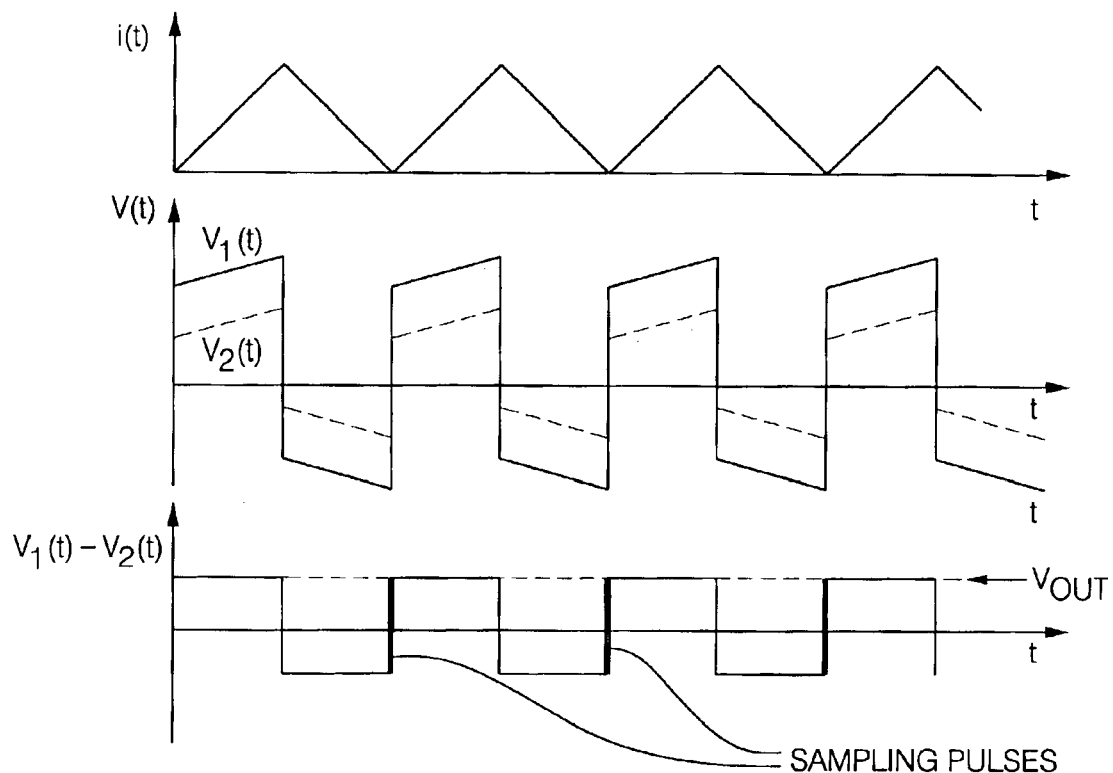
FIG. 9 shows graphs of the input current, input voltages at various points and output voltages of the force sensor according to FIG. 8.

As with the sensor 10 of FIG. 6, the sensor 10a of FIG. 8 uses an excitation source 30 with a triangular-shaped applied current i(t). The applied current i(t) thus has a constant slope so that the voltage across each of the coils 12, 22 is proportional to the inductance of the respective coil 12, 22. The current curve and voltage curves at different points in the sensor 10 are shown in FIG. 9. The same applied current i(t) flows through both coils 12, 22. One input of a differential operational amplifier (op amp) $A_1$ receives a signal from the first coil 12, while the other input receives a signal from the common junction of the first coil 12 and the second coil 22. This common junction also provides the signal to one input of a second differential op amp $A_2$, while the other input of the second differential op amp $A_2$ is grounded. The output of the differential op amp $A_1$ is $V_1(t)$, which is the voltage drop across the first coil 12, and the output of the second differential op amp $A_2$ is $V_2(t)$, which is the voltage drop across the second coil 22.

As the applied current i(t) increases, $V_1(t)$ jumps to a value proportional to the inductance of the first coil 12. Similarly, $V_2(t)$ jumps to a value proportional to the inductance of the second coil 22. These are referred to as the inductive components of the total voltage $V_1(t)$, $V_2(t)$. As described with reference to FIG. 7, each total voltage $V_1(t)$ and $V_2(t)$ also includes a resistive component, which gradually increases with the increasing value of i(t) such that the resistive component has the form of a ramp on top of the inductive component. When the applied current i(t) ramps down from its peak, that is, has a negative slope di/dt, each total voltage $V_1(t)$ and $V_2(t)$ goes negative. The total voltage $V_1(t)$ is equal to a negative value proportional to the inductance of the first coil 12 plus a value of the resistive component. Similarly, the total voltage $V_2(t)$ is equal to a negative value proportional to the inductance of the second coil 22 plus a value of the resistive component. Initially upon the change in the slope di/dt of the applied current i(t) from positive to negative, the value of the resistive component of each is at a maximum. As the applied current i(t) reduces to zero, each total voltage $V_1(t)$, $V_2(t)$ becomes more negative since the resistive component of each gradually decreases to zero with the applied current i(t). This results in a maximum negative value for each total voltage $V_1(t)$, $V_2(t)$ when the applied current reaches zero. The maximum negative value for $V_1(t)$ is proportional to the inductance of the first coil 12, and the maximum negative value for $V_2(t)$ is proportional to the inductance of the second coil 22.

The differential op amp $A_3$ of the sensor 10a produces the difference voltage $V_1(t)-V_2(t)$, which is an AC square wave shown in the final graph of FIG. 9. The amplitude of this square wave is proportional to the difference between the inductance of the first coil 12 and the inductance of the second coil 22. The phase of the square wave defines the polarity of the difference. The output voltage $V_{OUT}$ is extracted by a sample-and-hold circuit 34 by acquiring the value of $V_1(t)-V_2(t)$ at the rising edge of either, which captures both the amplitude and the polarity of the differential inductance.

Figure 10:
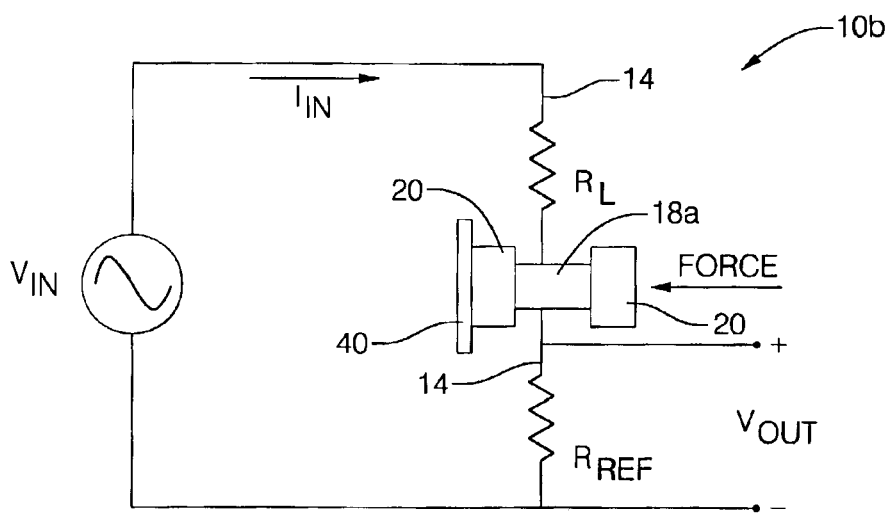
FIG. 10 is a simplified schematic diagram of a force sensor according to the present invention operated with a voltage source.

The variations of the circuitry 16 described with reference to FIGS. 6 and 8 are useful when the sensor is operated with a current source. The force sensor can also be operated with a voltage source. A simplified circuit diagram of a force sensor 10b illustrating the principles of this voltage mode of operation is shown in FIG. 10. The coil wrapped around the shaft 18a is not shown, but a resistance $R_L$ represents the intrinsic resistance of the coil. The coil is once again connected through leads 14 to an excitation source and a detection circuit. The excitation source is a sinusoidal voltage source $V_{IN}$. The end structures 20 are arranged normal to the stressed surface 40 and normal to the application of force as shown by the arrow. The detection circuit is not shown in detail, but this simplified schematic includes a resistor $R_{REF}$ in series with the coil resistance $R_L$.

The force sensor 10b operates by measuring the output voltage $V_{OUT}$ across this known, fixed resistance value as a function of applied stress. Experimental data was gathered using the force sensor of FIG. 10 with different coil/shaft combinations. Testing shows that creating the shaft using an alloy with a larger magnetostrictive coefficient than ordinary steel yields better results. In the force sensor of FIG. 10, the shaft 18a was created using an alloy comprising 49% nickel and 51% iron. This alloy has a much larger magnetostrictive coefficient than the ordinary steel described in the previous experiments. Additionally, the magnetostrictive coefficient of this alloy is positive. This means that the permeability is decreased with applied compressive stress, causing a decrease in coil inductance with applied stress. In the circuit of FIG. 10, as stress is applied and the inductance decreases, the current $I_{IN}$ in the circuit will increase. The voltage across the reference resistor $R_{REF}$ in series with the coil will also increase. While this shaft 18a is shown by example, when using a nickel-iron alloy for the stressed element in the sensor, the composition can range anywhere from about 20% nickel-80% iron to about 70% nickel-30% iron. More preferably, the composition ranges from about 45% nickel-55% iron to about 60% nickel-40% iron.

The relationship of the $V_{IN}$ to $V_{OUT}$ in the circuit of FIG. 10 is described by the following formula:

$$\frac{V_{OUT}}{V_{IN}} = \frac{R_{REF}}{R_L + R_{REF}}\left[1 + \left(\frac{\omega L}{R_L + R_{REF}}\right)^2\right]^{-\frac{1}{2}}; \text{where}$$

ω is the excitation frequency of the voltage source $V_{IN}$. Knowing the stress dependence of the inductance L of the coil, the change in $V_{OUT}$ with applied stress can be calculated.

Figure 11:
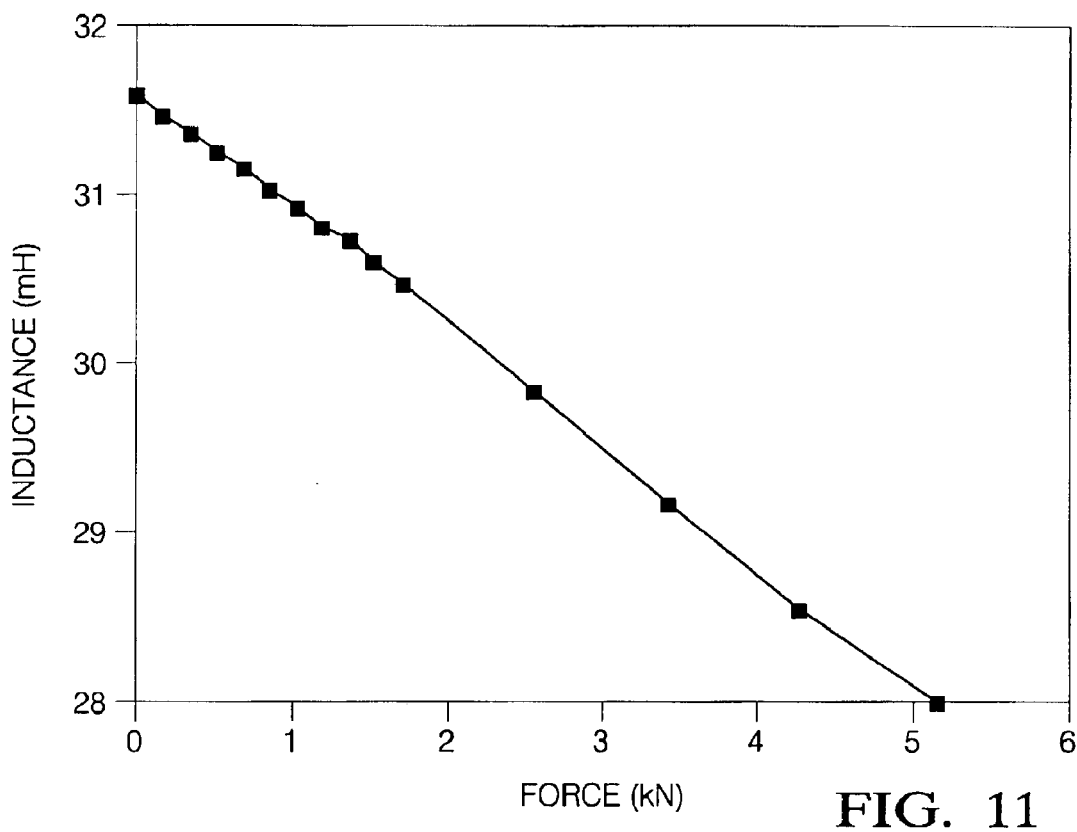
FIG. 11 is a graph illustrating the change in coil inductance versus applied load for the force sensor according to FIG. 10.
Figure 12:
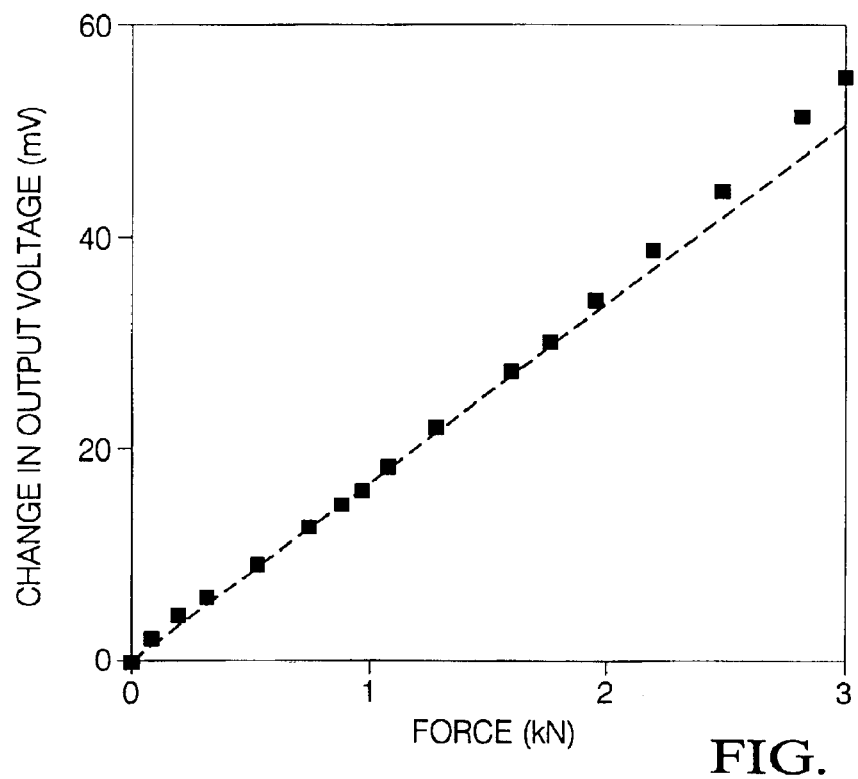
FIG. 12 is a graph illustrating the change in output voltage versus a force applied to a force sensor according to FIG. 10 using a nickel-iron shaft.

Testing was performed using the circuit of FIG. 10 and a shaft of the nickel-iron alloy previously described. A coil comprising 700 turns of copper wire with a coil inside diameter of ten mm, and outside diameter of twelve mm and a length of ten mm was also used. The change the inductance L of the coil versus the applied compressive force for a voltage source having an excitation frequency of five kHz is shown in FIG. 11. Over this range, inductance decreases by about 11%, a much greater change than seen in the case of the magnetic steel shaft. FIG. 12 shows the change in output voltage measured at several values of applied force. The dashed line in FIG. 12 plots the change in output voltage with applied force using the above formula and the inductance data of FIG. 11. Verification of the expected performance of the force sensor 10b can be seen in that the measured values correspond closely to those calculated.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A magnetic force sensor for measuring force applied to an object, the sensor comprising:
    a magnetostrictive element mountable on at least a portion of the object, the magnetostrictive element subjected to a prestress when in a mounted position;
    a conductive coil wound around at least a portion of the magnetostrictive element;
    an excitation source for exciting the conductive coil, wherein the excitation source is a sinusoidal current source; and
    a detection circuit for detecting one of an induced voltage across the conductive coil and a voltage drop across a resistor in series with the conductive coil and producing an RMS output voltage, wherein the one of the induced voltage across the conductive coil and the voltage drop across the resistor is indicative of a change in magnetic permeability of said magnetostrictive element due to the force applied to the object.

2. The magnetic force sensor according to claim 1, further comprising:
    means for determining the force applied using the RMS output voltage.

3. The magnetic force sensor according to claim 1 wherein the magnetostrictive element is a shaft, the force sensor further comprising:
    an end structure mounted on each end of the shaft and subjecting the shaft to a prestress.

4. The magnetic force sensor according to claim 1 wherein the conductive coil comprises a copper coil.

5. The magnetic force sensor according to claim 1 wherein the excitation source is operable to supply a triangular-shaped current waveform to the conductive coil.

6. The magnetic force sensor according to claim 5 wherein the detection circuit further comprises means for determining the force applied using the induced voltage across the conductive coil.

7. The magnetic force sensor according to claim 1, further comprising:
    means for determining one of a compressive force and a tensile force applied to the object using the one of the induced voltage and the voltage drop.

8. The magnetic force sensor according to claim 1 wherein the excitation source comprises a voltage source and the voltage drop across the resistor in series with the conductive coil indicates the force applied to the object.

9. The magnetic force sensor according to claim 1 wherein the magnetostrictive element comprises an alloy having a larger magnetostrictive coefficient than steel.

10. The magnetic force sensor according to claim 9 wherein the alloy comprises from about 20% to about 70% nickel, a remainder of the alloy being iron.

11. The magnetic force sensor according to claim 9 wherein the alloy comprises from about 45% to about 60% nickel, a remainder of the alloy being iron.

12. The magnetic force sensor according to claim 1 wherein the detection circuit comprises a sample-and-hold circuit.

13. A magnetic force sensor for measuring a force applied to an object, the sensor comprising:
 a magnetostrictive element mountable on at least a portion of the object, the magnetostrictive element subjected to a prestress when in a mounted position;
 a conductive coil wound around at least a portion of the magnetostrictive element;
 an excitation source for exciting the conductive coil, wherein the excitation source is a sinusoidal current source;
 a detection circuit for detecting one of an induced voltage across the conductive coil and a voltage drop across a resistor in series with the conductive coil and producing a RMS output voltage, wherein the one of the induced voltage across the conductive coil and the voltage drop across the resistor is indicative of a change in magnetic permeability of said magnetostrictive element due to the force applied to the object; and
 a second conductive coil wound around the magnetostrictive element in electrical series with the conductive coil and the excitation source, wherein the detection circuit further includes:
 means for detecting a second induced voltage across the second conductive coil.

14. The magnetic force sensor according to claim 13 wherein the conductive coil and the second conductive coil comprise conductors having a known relationship of impedance in an unstressed state and a known relationship of resistance over a temperature range.

15. The magnetic force sensor according to claim 14 wherein the induced voltage indicates one of a compressive force and a tensile force applied to the object and the second induced voltage indicates the other of the one of the compressive force and the tensile force applied to the object.

16. The magnetic force sensor according to claim 13 wherein the detection circuit further comprises means for subtracting the second induced voltage from the induced voltage.

17. The magnetic force sensor according to claim 16 wherein an output of the subtracting means represents a difference between an inductance of the conductive coil and an inductance of the second conductive coil.

18. The magnetic force sensor according to claim 16 wherein an output of the subtracting means is a square wave with an amplitude proportional to a difference between an inductance of the conductive coil and an inductance of the second conductive coil.

19. The magnetic force sensor according to claim 13 wherein the excitation source is operable to supply a triangular-shaped current waveform to the conductive coil.

20. A method of measuring a force applied to an object comprising the steps of:
 mounting a magnetostrictive element on at least a portion of the object wherein the magnetostrictive element is subjected to a prestress force and a conductive coil is wound around at least a portion of the magnetostrictive element;
 exciting the conductive coil using a sinusoidal current source; and
 detecting one of an induced voltage across the conductive coil and a voltage drop across a resistor in series with the conductive coil detecting and producing a RMS output voltage, the one of the induced voltage across the conductive coil and the voltage drop across the resistor indicative of a change in magnetic permeability of said magnetostrictive element due to the force applied to the object.

21. The method according to claim 20, further comprising the step of:
 determining the force applied using the RMS output voltage.

22. The method according to claim 20 wherein the exciting step further comprises the step of supplying a triangular-shaped current waveform to the conductive coil.

23. The method according to claim 22, wherein the detecting step further comprises the step of periodically sampling the induced voltage across the conductive coil.

24. The method according to claim 23, further comprising the step of:
 determining the force applied using the sampled induced voltage obtained during the sampling step.

25. The method according to claim 20 wherein a second conductive coil is wound around the magnetostrictive element in electrical series with the conductive coil, the method further comprising the steps of:
 exciting the second conductive coil; and
 detecting a second induced voltage across the second conductive coil.

26. The method according to claim 25 wherein the conductive coil and the second conductive coil comprise conductors having a known relationship of impedance in an unstressed state and a known relationship of resistance over a temperature range.

27. The method according to claim 26, further comprising the steps of:
 determining one of a compressive force and a tensile force applied to the object using the induced voltage; and
 determining the other of the one of the compressive force and the tensile force applied to the object using the second induced voltage.

28. The method according to claim 25, further comprising the step of:
 subtracting the second induced voltage from the induced voltage.

29. The method according to claim 28, further comprising the step of:
 determining the force applied to the object using a result of the subtracting step.

30. The method according to claim 20 wherein the exciting step comprises the step of applying a voltage to the conductive coil, the method further including the step of:
 determining the force applied to the object using the voltage drop across the resistor in series with the conductive coil.

* * * * *